(12) United States Patent
Kwok et al.

(10) Patent No.: US 7,053,883 B1
(45) Date of Patent: May 30, 2006

(54) ELECTRONIC DEVICE HAVING AN INTERACTIVE DISPLAY SCREEN

(75) Inventors: Lih Kwok, Singapore (SG); Gay Sze Tan, Singapore (SG); Boon Bee Chua, Singapore (SG); Kin Soon Liew, Singapore (SG)

(73) Assignee: Motorola, Inc., Schaumburg, IL (US)

( * ) Notice: Subject to any disclaimer, the term of this patent is extended or adjusted under 35 U.S.C. 154(b) by 139 days.

(21) Appl. No.: 09/694,441

(22) Filed: Oct. 24, 2000

(51) Int. Cl.
*G06F 17/28* (2006.01)

(52) U.S. Cl. ....................................... 345/156
(58) Field of Classification Search ................ 345/156, 345/157, 158, 160, 161, 163, 418
See application file for complete search history.

(56) References Cited

U.S. PATENT DOCUMENTS 5,483,262 A * 1/1996 Izutani ........................ 345/179
5,973,677 A   10/1999 Gibbons
6,473,728 B1 * 10/2002 Tognazzini .................... 704/3

* cited by examiner

*Primary Examiner*—Matthew G. Bella
*Assistant Examiner*—Cliff N. Vo
(74) *Attorney, Agent, or Firm*—Philip P. Macnak; Randi L. Karpinia; Daniel C. Crilly

(57) ABSTRACT

An electronic device (9) has an interactive screen display (27) which is interactive with a stylus (10). The electronic device (9) has an actuator (30) associated with an engagement member (18) of a housing (16) of the device. The actuator (30) is actuated when the stylus (10) engages the engagement member (20) to provide an activation signal indicative of the stylus engaging or disengaging the engagement member (20). As a result, the electronic device (9) or display screen is inactivated or activated when the stylus (10) engages the engagement member (20).

2 Claims, 3 Drawing Sheets

ELECTRONIC DEVICE HAVING AN INTERACTIVE DISPLAY SCREEN

FIELD OF THE INVENTION

This invention relates to an electronic device having an interactive display screen. The invention is particularly useful for, but not necessarily limited to, determining when a stylus for interacting with the display screen is stored in an engagement member of the device.

BACKGROUND ART

Electronic devices such as personal organisers and portable communication devices sometimes use an interactive display screen usually called a touch screen, to allow a user to input data or access functions. In order to achieve a higher resolution than can be obtained by use of a finger, some electronic devices have an associated stylus for activating the interactive display screen. For convenience, the stylus can be typically stored in an engagement member, typically an aperture, in a housing of the electronic device.

In U.S. Pat. No. 5,973,677, there is disclosed a rechargeable stylus and portable device assembly with an interactive display. The stylus is recharged when inserted into an engagement member in the housing where it is coupled to recharging electrical pads. When using a stylus with a portable communication device, a user typically has the stylus in one hand and the communication device in the other. This may not be ideal as the use may have difficulties in powering down, powering up or inactivating illumination of the display screen by use of a conventional button.

SUMMARY OF THE INVENTION

According to one aspect of the invention there is provided an electronic device comprising:
  a controller;
  an interactive display screen coupled to said controller;
  a housing having an engagement member for releasably engaging a stylus to allow mounting of a stylus to the housing;
  an actuator associated with the engagement member, wherein, in use, the actuator provides an activation signal indicative of the stylus engaging or disengaging the engagement member.

Suitably, when in use, the controller may provide a signal to activate the display screen in response to the signal indicative of the stylus disengaging the engagement member.

Preferably, when the activation signal is indicative of the stylus engaging the engagement member, the electronic device may power down.

Suitably, the actuator may be a biased switch.

Preferably, the biased switch may have a protruding member that protrudes into a stylus receiving chamber of the engagement member.

BRIEF DESCRIPTION OF THE DRAWINGS

In order that the invention may be readily understood and put into practical effect, reference will now be made to preferred embodiment illustrated in the accompanying drawings in which.

DETAILED DESCRIPTION OF THE PREFERRED EMBODIMENTS OF THE INVENTION

Figure 1:
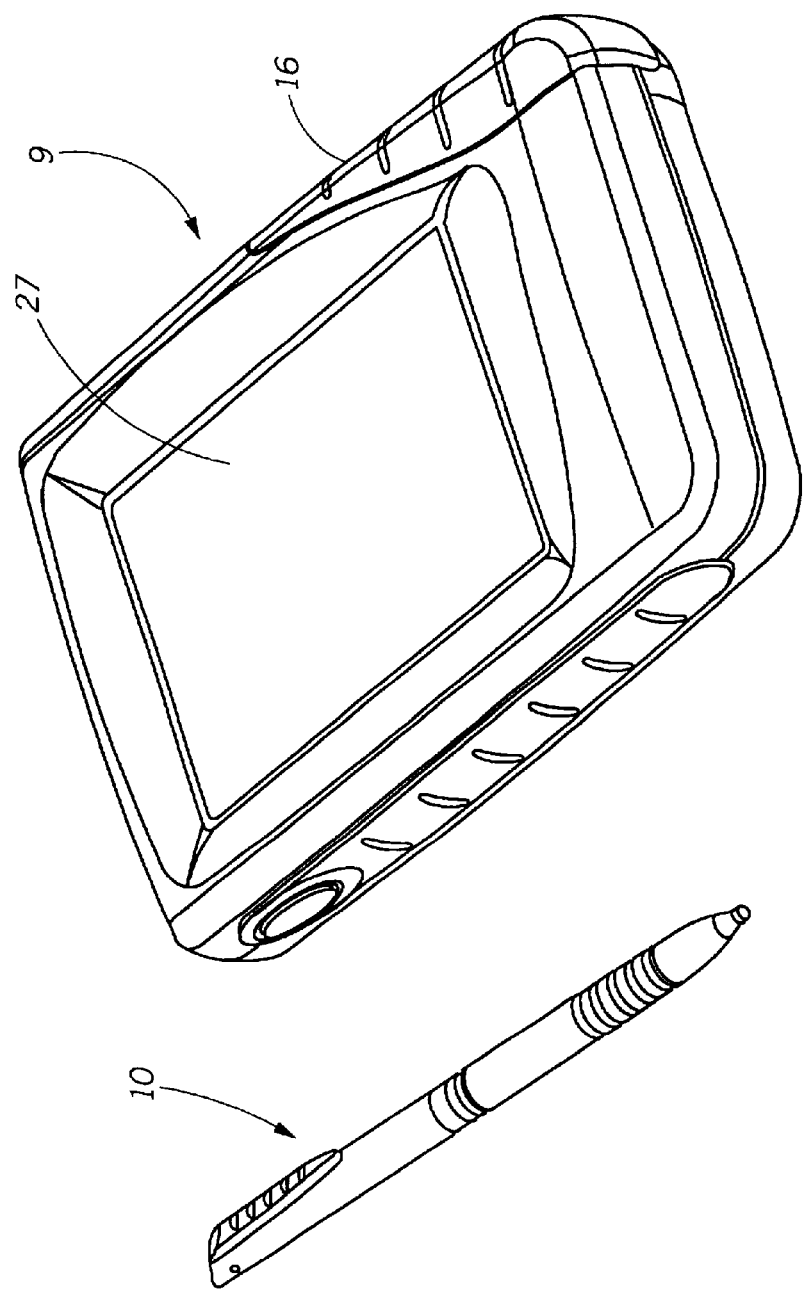
FIG. 1 is a top perspective view illustrating an electronic device in accordance with an embodiment of the invention.
Figure 2:
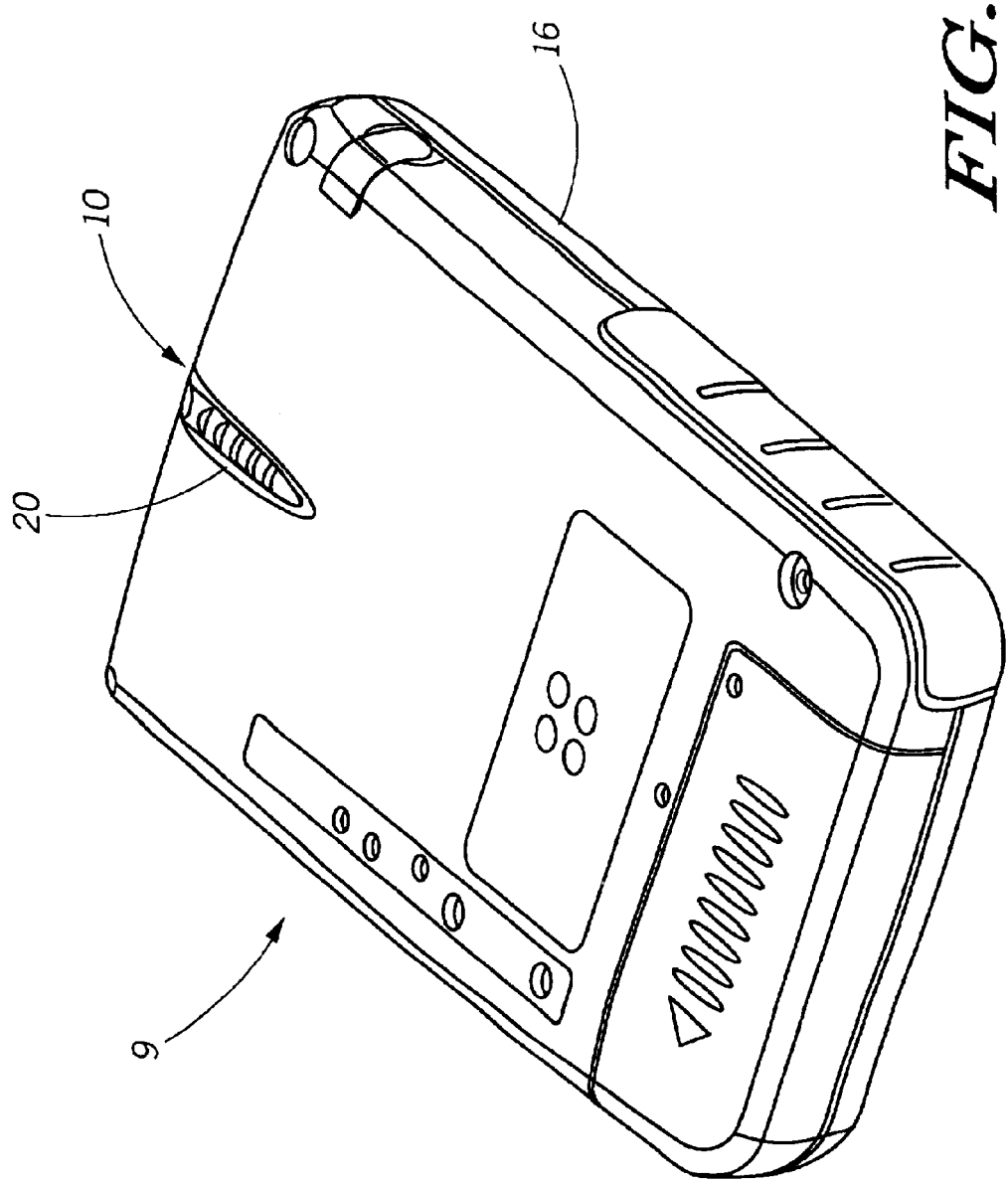
FIG. 2 is an underside perspective view of the electronic device of FIG. 1 with a stylus engaging an engagement member in a housing of the electronic device.

Referring to the Figs. in which like components are designated by identical numerals, reference is first directed to FIGS. 1 and 2 which illustrate an electronic device 9 such as personal organizer or a radio communication device. The electronic device 9 comprises a housing 16 and a stylus 10. FIG. 2 shows a stylus 10 engages an engagement member 20 of the electronic device 9. The electronic device 9 also comprises an interactive screen display 27 to show icons and messages, such as a telephone number, address data, and to input data. The stylus 10 is provided for interaction with display 27. There is also an engagement member 20 in the housing 16. The stylus 10 releasably engages by insertion into the engagement member 20, thereby conveniently storing the stylus 10. In this regard, the engagement member 20 can be wholly integrated as a storage chamber within the housing 16 or mounted on the housing 16 in the form of a clip. As will be apparent to a person skilled in the art, the stylus 10 interacts with the interactive screen display 27 for selecting functions, accessing data, selecting alphanumeric keys or even freehand writing and drawing that is processed by the electronic device 9.

Figure 3:
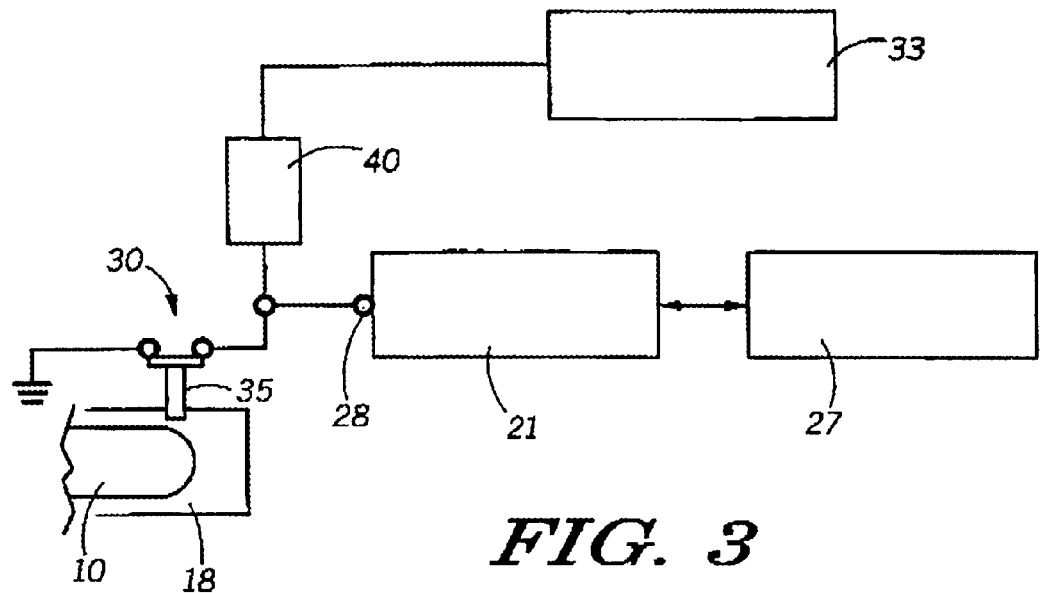
FIG. 3 is an electrical schematic block diagram of circuitry of a first preferred embodiment of the electronic device of FIG. 1.

Referring to FIG. 3, there is illustrated a preferred embodiment of a schematic diagram of circuitry of the electronic device 9. The interactive screen display 27 is coupled to a controller 21 to send message data and instructions therebetween. The electronic device 9 also comprises an actuator in the form of a biased switch 30 associated with a stylus receiving chamber 18 of the engagement member 20. The switch 30 is normally open and has one terminal coupled to ground and the other terminal coupled to a control input 28 of the controller 21 to provide a control signal thereto. A pull up resistor 40 is also coupled to control input 28 for maintaining control input 28 to logic "high" until switch 30 is activated. There is also a power supply 33 coupled to the controller 21 and all the necessary components in the circuitry.

The switch 30 has a biased protruding member 35 which protrudes into the stylus receiving chamber 18. The protruding member 35 is activated to electrically connect contacts of switch 30 when the stylus 10 is inserted into the stylus receiving chamber 18 thereby engaging engagement member 20. Conversely, the protruding member 35 is inactivated, thereby contacts of switch 30 are electrically isolated (open circuit), when the stylus 10 is removed from engagement member 20. When contacts of the switch 30 are electrically isolated, an activation signal indicative of the stylus 10 disengaging the engagement member 20 is provided to the controller 21. In response this signal, the controller 21 provides an activation signal to activate the display screen 27. When the stylus 10 is inserted into the receiving chamber 18 the contacts of switch 30 are electrically connected and an activation signal is provided to the controller 21 indicative of the stylus 10 engaging the engagement member 20. As a result, the controller 21 provides a signal to inactivate the display screen 27.

Figure 4:
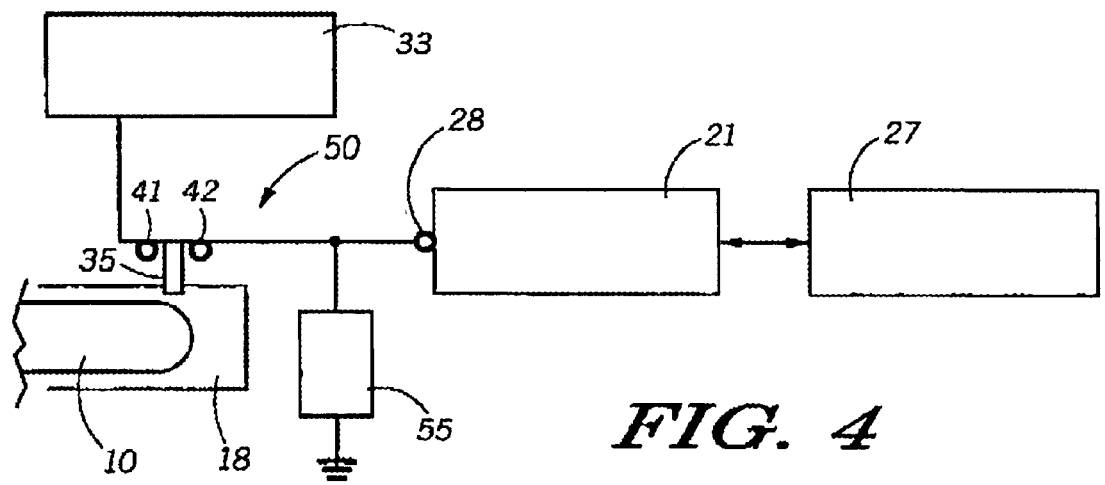
FIG. 4 is an electrically schematic diagram of circuitry of a second preferred embodiment of the electronic device of FIG. 1.

Referring to FIG. 4, there is illustrated a second preferred embodiment of a schematic diagram of circuitry of the electronic device 9. The circuitry has a normally closed switch 50 with two electrical terminals 41 and 42. The terminal 41 is coupled to the power supply 33 and terminal 42 is coupled to control input 28 of the controller 21. A pull down resistor 55 is also coupled to control input 28. All other components are configured identically to those of FIG. 3 and therefore require no further description. In use, when the stylus 10 is removed from the chamber 18, switch 50 becomes an open circuit; therefore, control input 28 is pulled to a logic "low" thereby invoking power down of the electronic device 9. In this regard, the storing of vital data and "software housekeeping" is conducted before actual power down, as will be an apparent to a person skilled in the art. In contrast, when the stylus 10 is inserted into chamber 18, switch 50 becomes closed thereby providing power to the control input 28 thereby invoking power up of the electronic device 9.

Advantageously, the present invention allows for the device or the display to be automatically inactivated or activated upon the stylus 10 engagement or disengagement with the engagement member 20. As a result, the user can access the information in the assembly more conveniently. The invention may also allow battery charge of the power supply 33 to be prolonged as the screen 27 is inactivated when the stylus engages engagement member 20.

Although the invention has been described and illustrated in the above description and drawings, it is understood that this description is by example only and that numerous changes and modifications can be made by those skilled in the art without departing from the true spirit and scope of the invention. For example, the biased switch 30 may be replaced with a capacitive, inductive or light sensor as will be apparent to a person skilled in the art.

We claim:

1. An electronic device for use with a stylus, the electronic device comprising:

an interactive display screen;

a power supply;

a housing having an engagement member for releasably engaging the stylus to allow mounting of the stylus to the housing, the engagement member defining a chamber; and an actuator including a protruding member that protrudes into the chamber and is configured to engage the stylus during unidirectional insertion of the stylus into the chamber in a first direction and to disengage the stylus during unidirectional removal of the stylus from the chamber in a second, opposite direction, the actuator also including a normally opan biased switch adapted and arranged to provide an actuation signal indicative of the stylus engaging or disengaging the protruding member; and a controller, operably coupled to the display screen and the acuator, the controller adapted and arranged to provide a signal to activate the display screen in response to the activation signal indicating that the stylus has disengaged the protruding member; and a pull-up resistor coupled at a first terminal to the power supply and coupled at a second terminal to the normally open biased switch and a control input of the controller, wherein the pull-up resistor maintains the control input of the controller at a logic "high" until the stylus engages the protruding member of the actuator.

2. The electronic device as in claim 1, wherein when the activation signal is indicative of the stylus engaging the protruding member, the electronic device powers down.

* * * * *